United States Patent Office 2,801,324
Patented July 30, 1957

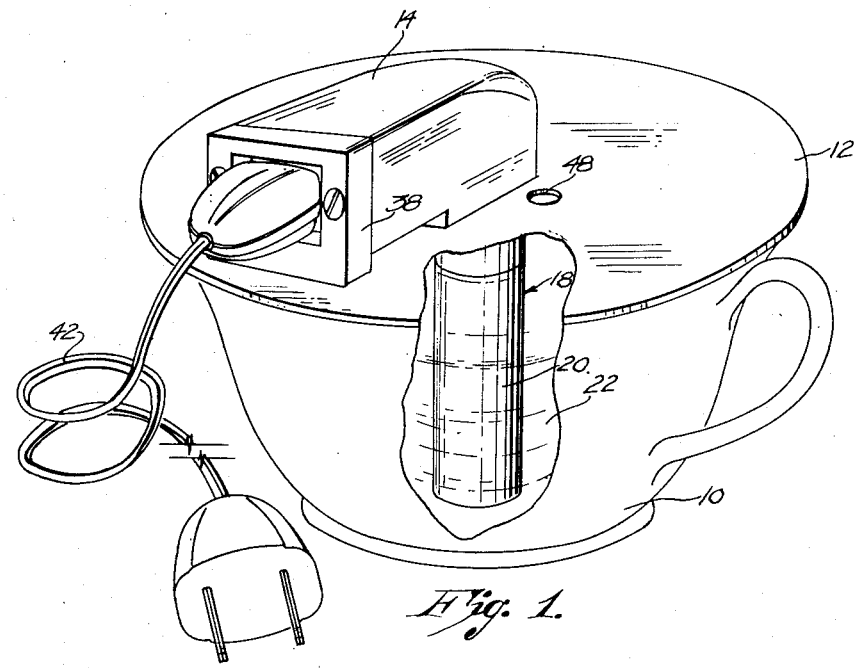

2,801,324

ELECTRIC LIQUID HEATER

Robert M. Ware, Quincy, Ill.

Application March 12, 1956, Serial No. 570,820

1 Claim. (Cl. 219—41)

This invention relates to a heating appliance adapted for use in combination with an open top container such as a cup and having primary utility in the making of coffee, the primary object being to provide an electrical assembly that may be easily and quickly coupled with the source of electrical energy and thereby placed in use to conveniently heat water or other liquid preparatory to the brewing of coffee or for other purposes.

It is the most important object of the present invention to provide a heating appliance that is mounted directly on a lid, plate or cover for a container in depending relationship thereto whereby the same will quickly heat the liquid in the container when the lid is placed thereon and the device connected to a source of current.

Another important object of the instant invention is to provide a device as just above set forth having a handle on the aforementioned plate for the convenience of the user and within which is mounted the necessary means for coupling the heating element of the appliance with a source of energy.

A further object of the instant invention is to provide a heating appliance that includes a tube adapted for immersion in the liquid to be heated and containing the electrical heating element with the latter disposed adjacent the bottom of the tube so that the liquid is uniformly heated.

A still further object of this invention is to provide an appliance for heating liquid wherein the tube which contains the heating element has a filling of sand or the like for conducting heat into the liquid more slowly at the top of the cup or container than adjacent the heating element itself.

In the drawing:

Figure 1 is a perspective view of an electric liquid heater made pursuant to my present invention, parts being broken away for clearness;

Fig. 2 is substantially a central, vertical, cross-sectional view through the heater showing the same entirely removed from the container; and Fig. 3 is a fragmentary elevational view of the heater shown in Fig. 2.

The heater forming the subject matter of the instant invention is shown in Figure 1 of the drawing operably mounted on a conventional cup 10 inasmuch as one of its primary uses is that of heating a small amount of liquid as for example, when making coffee. In this respect, the present day availability of instant coffee is well known and as will hereinafter appear, it is but necessary to place a desired amount of such finely ground coffee in the container 10 together with the water and in but a few minutes the beverage is ready for drinking.

Cup 10 is shown in Figure 1 covered by a relatively thin, flat plate or disc 12 thereby serving as a lid for the open top container 10. The handle 14 secured to the upper face of the lid 12 serves the dual purpose of facilitating use of the device and providing an operable connection between a source of electrical energy and a heating element 16 contained within a heating appliance broadly designated by the numeral 18.

The appliance 18 includes an elongated tube 20 of heat conducting material depending from the lid 12 into the cup 10 for at least partial immersion within water or other liquid 22 to be heated.

The substantially L-shaped tubular handle 14 is attached to the lid 12 by suitable fastener 24 in register or communication with the upper end of tube 20, the latter of which is provided with a closed lowermost end 26. Tube 20 extends through an opening 28 centrally disposed within the lid 12 and is press fitted into the handle 14 as seen in Fig. 2. A plug 30 of electrical insulating material within the handle 14 closes the upper end of tube 20.

The heating element 16 includes a support 32 of refractory material or other substance having electrical insulating properties yet capable of heat conduction and to this end porcelain or other ceramic substances may be utilized. The support 32 is provided with a plurality of longitudinal bores within which is wound a resistance 34 which may be selected for its ability to offer great resistance to passage of current. Nichrome is commonly employed for this purpose and may be utilized if desired.

A plate 35 carrying a pair of electrical prongs 36 is held in place within the handle 14 by a removable ring 38 and the prongs 36 are operably coupled with the resistance wire 34 by wires 40. It is seen, therefore, that the heating element 16 may be connected with a source of electrical energy by an extension cord 42 when the latter is plugged in place as illustrated in Fig. 1. The wires 40 pass through the plug 30 and the resistance winding 34 is insulated away from the closure 26 by disc 44 of insulating material.

It has been found that when a heating element is utilized which extends the full length of the tube 20, the liquid 22 is quickly heated adjacent the level thereof while the liquid at the bottom of the cup 10 remains relatively cool. In order to rectify such defect it is to be noted that element 16 is preferably shorter than the tube 20 and the latter is filled with heat conducting material 46 such as ordinary sand. Under such conditions, as soon as steam commences to flow through outlet port 48 in the lid 12, the user is assured that all the liquid 22 has been heated to a substantially uniform temperature.

When the device is used for the making of a cup of coffee, the water and instant coffee powder are placed in the cup 10 and it has been found that the resulting beverage has an improved flavor since the pouring of hot water on such powder tends to age the same immediately. Furthermore, it has been found that less coffee is needed in order to produce a beverage of desired strength.

Many uses for the heater are contemplated. For example, it is possible for traveling men, tourists and the like to carry the entire unit into hotel rooms and in this respect it is well known that instant coffee is today being packaged in relatively small envelopes. Therefore, ordinary tap water may be employed in the hotel room for quickly brewing a cup of coffee or other beverage as may be desired.

Manifestly, the heater has use also in the home and is capable of being employed for various purposes other than the brewing of coffee desired.

Having thus described the invention, what is claimed as new and desired to be secured by Letters Patent is:

In combination with a coffee cup, a coffee maker comprising flat plate normally resting upon and covering the cup, said plate having a steam outlet port and a central opening therein; a tubular, L-shaped handle secured to the upper face of the plate in register with the opening; a cylindrical tube of heat conducting material mounted in the opening, depending vertically from the plate into the cup, and communicating at its upper end with the handle, the lowermost end of the tube having a closure; a heating element resting on the closure within the tube and including a cylindrical support of refractory material within the tube and having a plurality of bores extending therethrough between its ends and a conductor capable of offering substantial resistance to passage of an electrical current serpentinely wound within the support through said bores of the latter; a filling of sand in the tube filling that portion of the tube below the plate and above the element; a fixture in the handle adapted for connection with a source of electrical energy; and wire means in the handle and the tube coupling the conductor with the fixture.

References Cited in the file of this patent

UNITED STATES PATENTS

| | | |
|---|---|---|
| 1,183,924 | Waters | May 23, 1916 |
| 1,203,975 | Carlson | Nov. 7, 1916 |
| 1,359,390 | Kuhn et al. | Nov. 16, 1920 |
| 1,599,912 | Naujoks | Sept. 14, 1926 |
| 2,695,948 | Hanson | Nov. 30, 1954 |